Jan. 20, 1959
O. A. HAGEN
2,869,276
FISHING REEL BRACE ATTACHMENT
Filed March 27, 1958
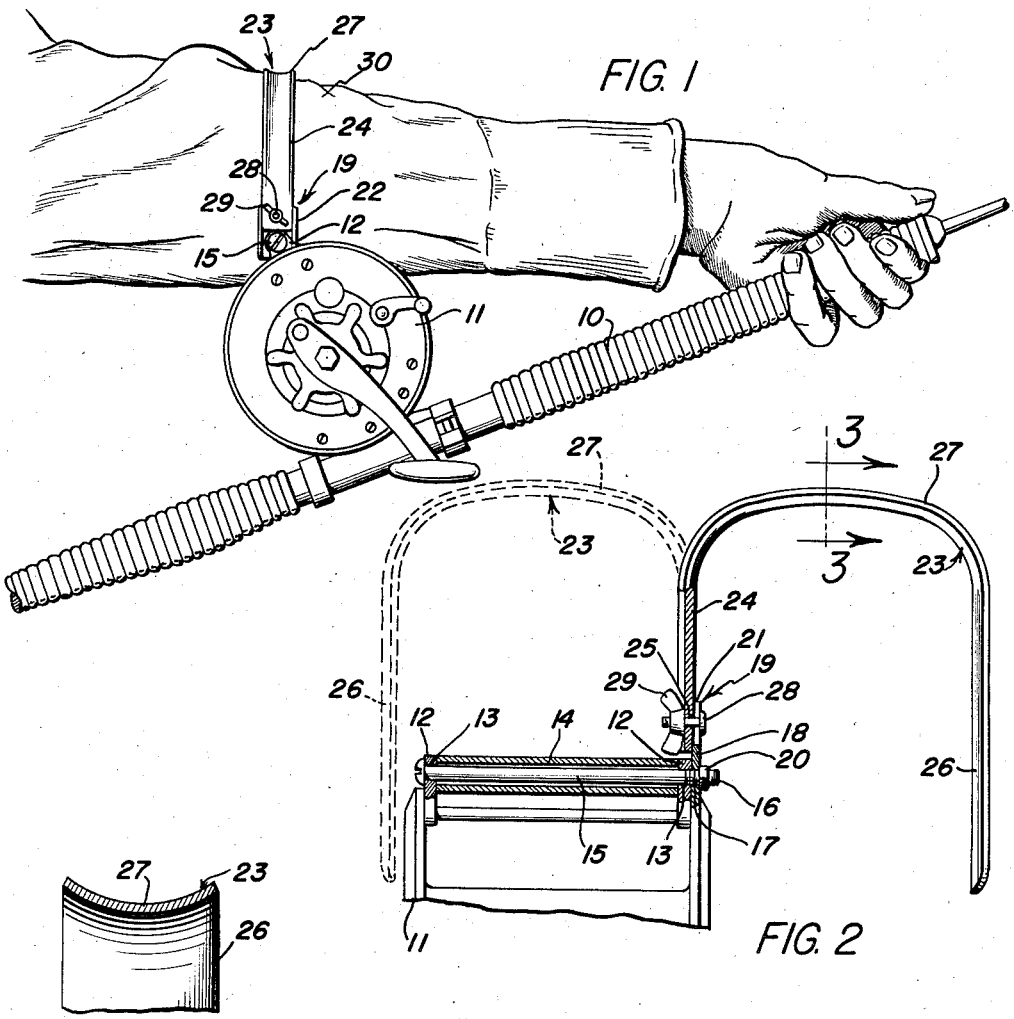
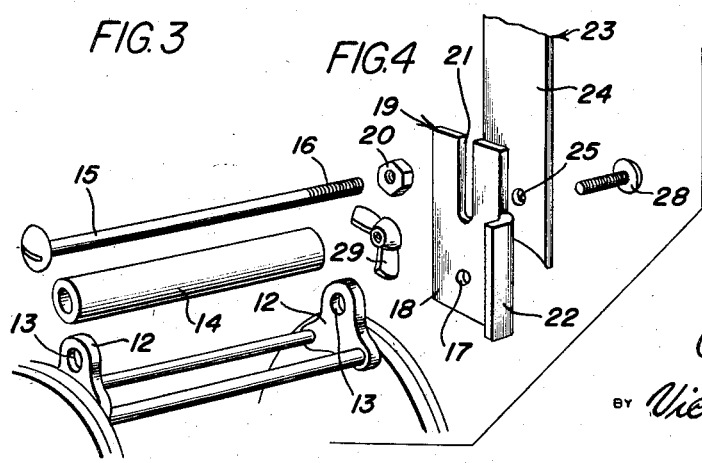
INVENTOR.
Oscar A. Hagen
BY *Victor J. Evans & Co.*
ATTORNEYS

United States Patent Office 2,869,276
Patented Jan. 20, 1959

2,869,276

FISHING REEL BRACE ATTACHMENT

Oscar A. Hagen, Mariposa, Calif.

Application March 27, 1958, Serial No. 724,294

2 Claims. (Cl. 43—25)

This invention relates to fishing equipment, and more particularly to a brace attachment for a fishing reel and rod.

The object of the invention is to provide a brace which is adapted to be attached to a conventional fishing reel so that the rod and reel can be more conveniently supported on a person's arm during periods of use of the fishing equipment.

Another object of the invention is to provide a fishing reel brace attachment which will prevent the rod and reel from wobbling as for example when large game fish are being reeled in, or when large fish are being trolled for on various bodies of water.

A further object of the invention is to provide a fishing reel brace attachment which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view illustrating the fishing reel brace attachment of the present invention in use.

Figure 2 is a sectional view, showing the device removed from a person's arm.

Figure 3 is a sectional view taken on the line 3—3 of Figure 2.

Figure 4 is a fragmentary perspective view showing the parts in disassembled relation with respect to each other.

Referring in detail to the drawings, the numeral 10 indicates a portion of a fishing rod which has a conventional fishing reel 11 connected thereto, Figure 1, and the reel 11 is provided with a pair of spaced parallel lugs or posts 12 which are each provided with an aperture or opening 13 therein, Figure 4.

Positioned between the pair of lugs 12 is a hollow tubular member or tube 14, and the numeral 15 indicates a bolt or headed pin which extends through the tube 14 and through the openings 13 in the lugs 12. An end portion of the bolt or pin 15 is threaded as at 16, and the pin 15 also projects through an aperture or opening 17 in the main portion 18 of a bracket 19. The numeral 20 indicates a nut which is arranged in threaded engagement with the threaded portion 16 of the pin or bolt 15.

As shown in the drawings, the bracket 19 is provided with an elongated slot 21 as well as a flange 22.

The numeral 23 indicates a substantially U-shaped brace which includes a first leg 24 that is provided with an opening 25 therein, and the brace 23 further includes a second leg 26, and the legs 24 and 26 are interconnected together by means of a web or crosspiece 27 which is arcuate or curved in cross section, as for example as shown in Figure 3.

There is further provided a bolt 28 or securing element 28 which extends through the opening 25 in the leg 24, and the bolt 28 also extends through the slot 21 in the bracket 19, there being a wing nut or thumb nut 29 connected to the bolt 28 whereby the brace 23 will be retained in its proper assembled position. In Figure 1 the numeral 30 indicates a portion of a person's arm which is engaged by the brace 23 whereby the fishing rod and reel will be steadied when the person is fishing.

From the foregoing, it is apparent that there has been provided a brace attachment for use with a fishing rod and reel whereby a person will be able to hold the rod and reel in a more steady manner, and this is especially suitable as for example when large fish are being reeled in.

According to the present invention, it will be noted that the reel 11 has the lugs 12, and positioned between the lugs 12 is the tube 14. The bolt 15 extends through the apertures 13 and through the tube 14 and the bolt 15 also extends through the opening 17 in the bracket 19, and the nut 20 is arranged in engagement with the threaded portion 16 of the bolt 15 whereby the bracket 19 will be maintained connected to the reel 11. Furthermore, the bracket 19 includes the flange 22 which helps stabilize or steady the reel 23. Also, the bolt 28 extends through the opening 25 in the leg 24 of the brace 23, and this bolt 28 has a nut 29 thereon whereby the brace 23 will remain connected to the bracket 19.

When the device is being used, the brace 23 is in the position shown in Figure 1 or in the solid line position shown in Figure 2 so that the web portion 27 of the brace 23 engages the arm 30 and this arrangement insures that the reel 11 and fishing rod 10 will be held steady while the person is fishing and this is especially advantageous during the reeling in or catching of large fish since it is important to maintain the rod and reel in a steady manner. Thus, with the present invention, the fisherman will have less risk or less chance of losing a fish which may be hooked since the rod and reel will be held in a more efficient or steady manner.

When the brace is not being used, the wing nut 29 can be loosened so that the brace 23 can be moved from the solid line position shown in Figure 2 to the dotted line position shown in Figure 2 whereby the brace can be moved to an out-of-the-way position so that the entire unit will occupy a minimum amount of space for storage or shipment. It is to be noted that as shown in Figure 3 for example, the web or crosspiece 27 is arcuate in cross-section so as to more snugly or comfortably conform to the curvature of the person's arm 30 whereby the brace can be comfortably used or worn.

Furthermore, the brace assembly of the present invention will not interfere with normal use of the rod and reel, and in fact will permit the rod and reel to be used with greater ease or facility. The parts can be made of any suitable material and in different shapes or sizes.

Since the brace 23 can be swung to the dotted line position shown in Figure 2 when it is not being used, the device will be less bulky to carry or store. The tube 14 helps provide a brace between the lugs 12.

Thus, it will be seen that there has been provided a fishing reel brace attachment which will serve to keep or prevent the fishing reel and rod from wobbling, as for example when using star drag reels when reeling in large game or when trolling for large fish on different bodies of water.

The device consists of a minimum number of parts and it can be readily attached to a conventional reel as for example if the reel is a star drag type with two loop eyes or lugs. The brace or hook 23 hooks over the person's forearm and keeps the reel braced so that when there is a heavy pull, the reel cannot wobble whereby the fish can be more easily reeled in.

After the brace 23 has been moved to the solid or dotted line position shown in Figure 2, the wing nut 29 can again be tightened so as to maintain the brace immobile in its adjusted position. The tube 14 keeps the lugs 12 in place so that they will not cramp the reel when the parts are tightened. In certain instances the bolt 15 and tube 14 may be made as a one-piece construction.

Minor changes in shape, size and rearrangement of details coming within the field of invention claimed may be resorted to in actual practice, if desired.

I claim:

1. In a device of the character described, a fishing rod, a reel connected to said rod, a pair of spaced parallel lugs extending from said reel and said lugs being provided with registering apertures, a hollow tube positioned between said lugs, a headed pin extending through said apertures and through said tube, a bracket arranged adjacent the outer surface of one of said lugs and said bracket including a main portion provided with an opening for the projection therethrough of said pin, a flange on one side of the bracket, there being a vertically disposed slot in the upper portion of the bracket, a U-shaped brace including first and second spaced apart legs and a web extending between said legs, there being an opening in said first leg, and a securing element extending through the opening in said first leg and through the slot in said bracket.

2. In a device of the character described, a fishing rod, a reel connected to said rod, a pair of spaced parallel lugs extending from said reel and said lugs being provided with registering apertures, a hollow tube positioned between said lugs, a headed pin extending through said apertures and through said tube, a bracket arranged adjacent the outer surface of one of said lugs and said bracket including a main portion provided with an opening for the projection therethrough of said pin, a flange on one side of the bracket, there being a vertically disposed slot in the upper portion of the bracket, a U-shaped brace including first and second spaced apart legs and a web extending between said legs, there being an opening in said first leg, and a securing element extending through the opening in said first leg and through the slot in said bracket, said web being arcuate in cross section.

References Cited in the file of this patent

UNITED STATES PATENTS 2,146,350     Roberts   ---------------- Feb. 7, 1939

FOREIGN PATENTS 16,692     Great Britain  ------------ June 8, 1916